(12) United States Patent
Baba (10) Patent No.: US 10,659,639 B2
(45) Date of Patent: May 19, 2020

(54) IMAGE READING APPARATUS (71) Applicant: KYOCERA Document Solutions Inc., Osaka-shi, Osaka (JP)

(72) Inventor: Masaki Baba, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/383,834

(22) Filed: Apr. 15, 2019

(65) Prior Publication Data

US 2019/0327375 A1 Oct. 24, 2019

(30) Foreign Application Priority Data

Apr. 23, 2018 (JP) .................. 2018-082273

(51) Int. Cl.
H04N 1/00 (2006.01)
H04N 1/10 (2006.01)
(52) U.S. Cl.
CPC ..... *H04N 1/00708* (2013.01); *H04N 1/00737* (2013.01); *H04N 1/00779* (2013.01); *H04N 1/10* (2013.01)
(58) Field of Classification Search
CPC .......... H04N 1/00708; H04N 1/00737; H04N 1/00779; H04N 1/10

USPC ................. 358/449, 1.9, 1.15, 474
See application file for complete search history.

(56) References Cited

U.S. PATENT DOCUMENTS

2016/0295044 A1* 10/2016 Nakamura ......... H04N 1/00708
2016/0309049 A1* 10/2016 Tagami .............. H04N 1/00827

FOREIGN PATENT DOCUMENTS

JP 2006067330 A 3/2006

* cited by examiner

*Primary Examiner* — Quang N Vo
(74) *Attorney, Agent, or Firm* — Alleman Hall Creasman & Tuttle LLP (57) ABSTRACT An image reading apparatus includes a document sheet table, an image reading portion, a detection processing portion, and a determination processing portion. A document sheet is placed on the document sheet table. The image reading portion reads linear image data representing an image of a linear area that extends along a main scanning direction of the document sheet that is placed on the document sheet table. The detection processing portion detects, based on the linear image data, a size of the document sheet in the main scanning direction. The determination processing portion determines, when the size of the document sheet in the main scanning direction detected by the detection processing portion meets a specific condition, that the document sheet is a predetermined card-shaped document sheet.

5 Claims, 5 Drawing Sheets

| SIZE OF DOCUMENT SHEET IN MAIN SCANNING DIRECTION | | EXISTENCE OF DOCUMENT AT DETECTION POSITION | |
|---|---|---|---|
| REFERENCE SIZE | DETERMINATION RANGE | DOES NOT EXIST | DOES EXIST |
| - | 43.9mm AND BELOW | NO DOCUMENT SHEET | NON-STANDARD |
| 53.98mm | 44.0mm~69.7mm | CARD R | NON-STANDARD |
| 85.6mm | 69.8mm~89.9mm | CARD | NON-STANDARD |
| 100.0mm | 90.0mm~115.0mm | POSTCARD, A6R | NON-STANDARD |
| 128.5mm | 115.1mm~138.5mm | B6R | NON-STANDARD |
| 148.5mm | 138.6mm~158.5mm | A5R | NON-STANDARD |
| 182.0mm | 158.6mm~192.0mm | B5R | NON-STANDARD |
| 210.0mm | 192.1mm~240.0mm | A4R | Folio, B4 |
| 257.0mm | 240.1mm~267.0mm | B5 | B4 |
| 279.4mm | 267.1mm~286.9mm | A4 | 11×15, A3 |
| 297.0mm | 287.0mm AND ABOVE | A4 | A3 |

IMAGE READING APPARATUS

INCORPORATION BY REFERENCE

This application is based upon and claims the benefit of priority from the corresponding Japanese Patent Application No. 2018-082273 filed on Apr. 23, 2018, the entire contents of which are incorporated herein by reference.

BACKGROUND

The present disclosure relates to an image reading apparatus configured to read an image of a document sheet that is placed on a document sheet table.

There is known a document sheet reading apparatus configured to pick up, with an area sensor, an image of a specific area in a document sheet table, and detect, based on a combination of pieces of information indicating whether or not a document sheet exists at a plurality of detection positions that are set within the specific area, a size of the document sheet placed on the document sheet table.

SUMMARY

An image reading apparatus according to an aspect of the present disclosure includes a document sheet table, an image reading portion, a detection processing portion, and a determination processing portion. A document sheet is placed on the document sheet table. The image reading portion reads linear image data representing an image of a linear area that extends along a main scanning direction of the document sheet that is placed on the document sheet table. The detection processing portion detects, based on the linear image data, a size of the document sheet in the main scanning direction. The determination processing portion determines, when the size of the document sheet in the main scanning direction detected by the detection processing portion meets a specific condition, that the document sheet is a predetermined card-shaped document sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus]

Figure 1:
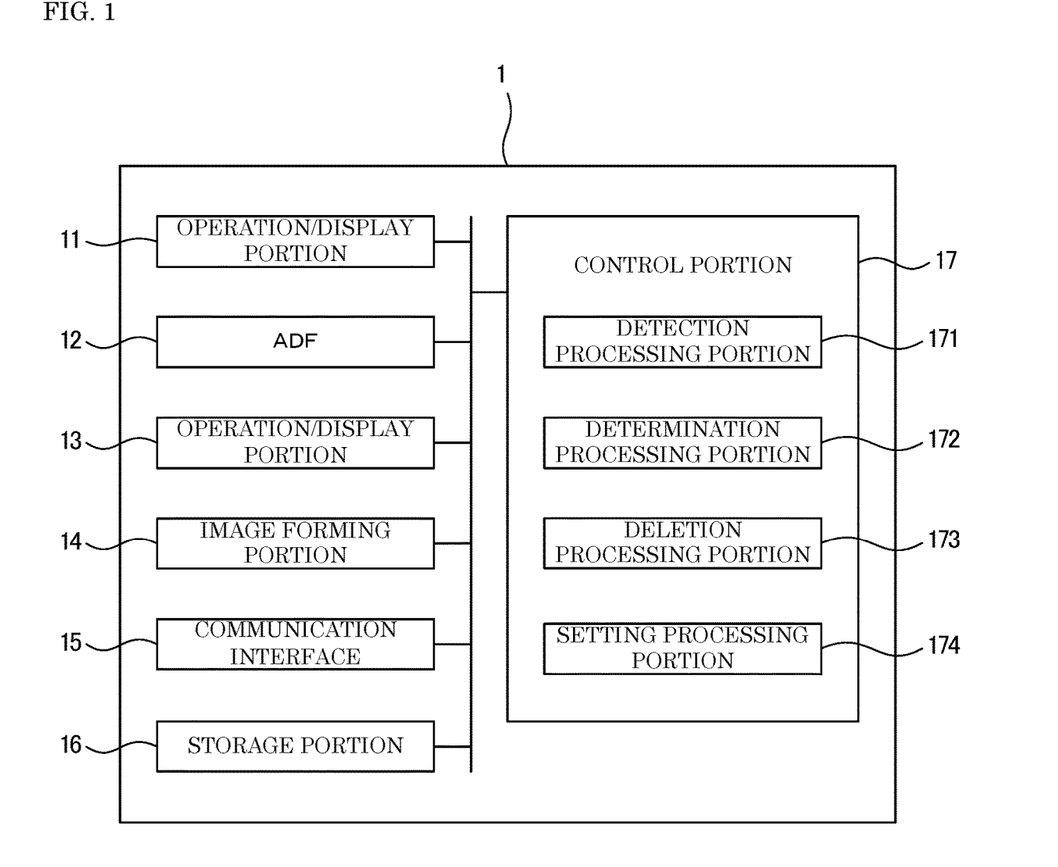
FIG. 1 is a block diagram showing a configuration of an image forming apparatus according to an embodiment of the present disclosure.

As shown in FIG. 1, an image forming apparatus 1 according to an embodiment of the present disclosure includes an operation/display portion 11, an ADF 12, an image reading portion 13, an image forming portion 14, a communication interface 15, a storage portion 16, and a control portion 17. Specifically, the image forming apparatus 1 is a multifunction peripheral including printing, scanning, copying, and facsimile functions. The image forming apparatus 1 is an example of an image reading apparatus according to the present disclosure. It is noted that the present disclosure is not limited to a multifunction peripheral, and may be applied to any image reading apparatus including an image reading function, such as a copier, scanner, or facsimile.

The operation/display portion 11 includes a display portion such as a liquid crystal display for displaying information, and an operation portion such as a touch panel and operation buttons for receiving a user operation.

The ADF 12 includes a document setting portion, conveying rollers, a document holder, and a sheet discharge portion, and is an automatic document feeding device for feeding a document to be read by the image reading portion 13.

Figure 2:
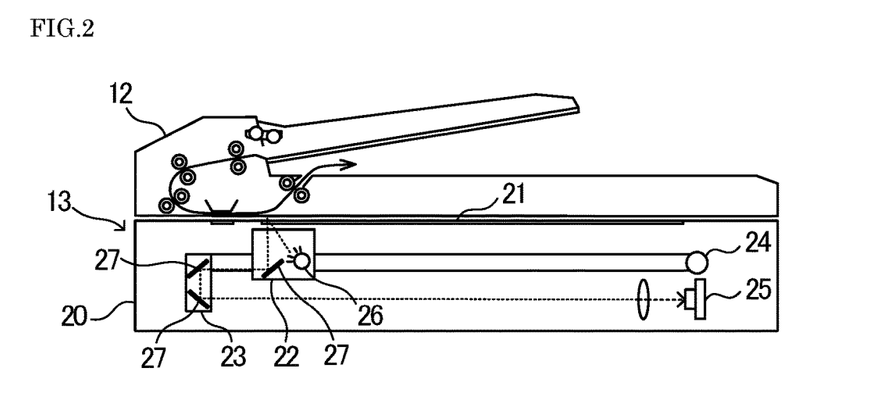
FIG. 2 is a schematic diagram showing a configuration of an ADF and an image reading portion of the image forming apparatus according to the embodiment of the present disclosure.

As shown in FIG. 2, the image reading portion 13 includes a housing 20, a document sheet table 21, a first carriage 22, a second carriage 23, a carriage supporting portion 24, and an image sensor 25. The image reading portion 13 reads an image of a document sheet that is placed on the document sheet table 21 or conveyed by the ADF 12, and generates document sheet image data that represents the image of the document sheet.

The first carriage 22 is provided with a light source 26 and a mirror 27, and the second carriage 23 is provided with two mirrors 27. The light source 26 emits light from below the document sheet table 21, and irradiates a linear area that extends in the document sheet table 21 along a main scanning direction (a direction perpendicular to a sheet surface in FIG. 2). The plurality of mirrors 27 guide light reflected from the document sheet toward the image sensor 25. The image sensor 25 is, for example, a CCD (Charge Coupled Device), and outputs image data in response to an amount of the light reflected from the document sheet. In this way, the image reading portion 13 reads linear image data representing an image of a linear area that extends along the main scanning direction of a document sheet that is placed on the document sheet table 21. It is noted that the image sensor 25 may be provided on the first carriage 22.

The carriage supporting portion 24 moveably supports the first carriage 22 and the second carriage 23 along the document sheet table 21 in a sub-scanning direction (left-right direction in FIG. 2). More specifically, the carriage supporting portion 24 moves the first carriage 22 and the second carriage 23 in conjunction with one another in the sub-scanning direction, by a driving force from a motor (not shown) such as a stepping motor. At this time, the carriage supporting portion 24 moves the second carriage 23 at a moving speed that is half of that of the first carriage 22.

Inside of the housing 20 of the image reading portion 13, the first carriage 22 irradiates light from the light source 26 to the document sheet, and scans the documents sheet that is on the document sheet table 21. The image sensor 25 outputs image data in response to the amount of light reflected from the document sheet. In this way, the image reading portion 13 generates, based on a plurality of pieces of the linear image data that are read sequentially along the sub-scanning direction of the document sheet, the document sheet image data that represents the image of the document sheet.

The image forming portion 14 executes, based on image data, a print process by an electrophotographic or inkjet method, and forms an image on a sheet Sh based on the document sheet image data. For example, in a case where the image forming portion 14 is an electrophotographic image forming portion, the image forming portion 14 includes a photoconductor drum, a charging device, an exposure device, a developing device, a transfer device, and a fixing device.

According to a specific communication protocol, the communication interface 15 executes a communication process with an information processing device such as an external facsimile device or a personal computer, via a communication network such as a telephone line, the internet, or a LAN.

The storage portion 16 is a nonvolatile storage portion such as a hard disk or flash memory. Various programs for executing a copy process described below that is executed by the control portion 17, and a document sheet determining table D1 described below are stored in the storage portion 16.

The control portion 17 includes control devices such as a CPU, a ROM, and a RAM. The CPU is a processor for executing various kinds of arithmetic processing. The ROM is a nonvolatile storage portion in which information such as a control program for making the CPU execute various processes is preliminarily stored. The RAM is a volatile or nonvolatile storage portion used as a temporary storage memory (work area) for various processes executed by the CPU.

Meanwhile, as a related art of the image forming apparatus 1 according to the present embodiment, there is known a document sheet reading apparatus that picks up an image of a specific area in a document sheet table with an area sensor, and based on a combination of pieces of information indicating whether or not the document sheet exists at a plurality of detection positions that are set within the specific area, detects a size of the document sheet that is placed on the document sheet table. The document sheet reading apparatus determines, based on the combination of pieces of information indicating whether or not the document sheet exists at the plurality of detection positions, a size of the document sheet among a plurality of predetermined standard sizes (for example, A3, A4, A4R, A5, AA5R, A6, B4, B5, B5R, B6). With this configuration, the document sheet reading apparatus detects the size of the document sheet without performing pre-scanning. However, when the document sheet is a card-shaped document sheet such as a driver's license, the document sheet is not detected at any of the detection positions, and the size of the document sheet is determined to be non-standard. As a solution to this issue, the image forming apparatus 1 according to the present embodiment is capable of determining whether or not a document sheet placed on the document sheet table 21 is a card-shaped document sheet, without performing pre-scanning.

Specifically, the control portion 17 includes a detection processing portion 171, a determination processing portion 172, a deletion processing portion 173, and a setting processing portion 174. It is noted that the control portion 17 functions as these processing portions by executing various processes according to the control program. In addition, the control portion 17 may include one or more electronic circuits, such as an ASIC (Application Specific Integrated Circuit), for realizing a part of these processing portions or a plurality of processing functions.

Figure 3:
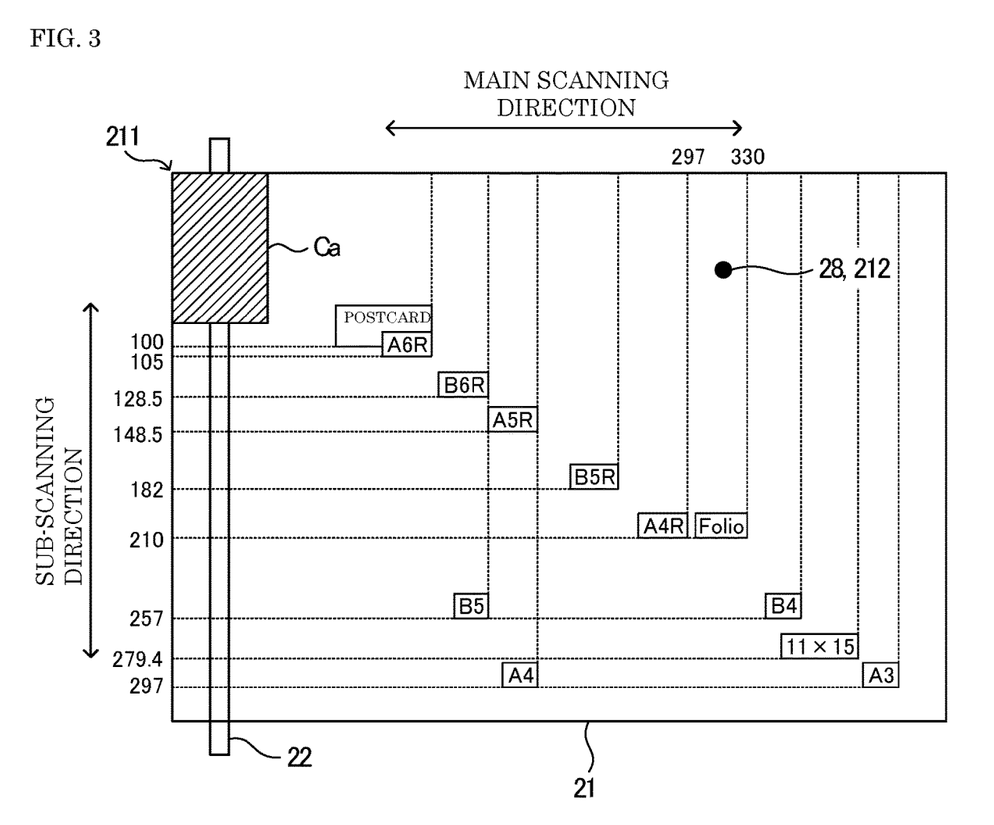
FIG. 3 is a diagram showing placement positions in a document sheet table for various types of standard-sized document sheets, and a detection position of a document sheet sensor of the image forming apparatus according to the embodiment of the present disclosure.

Based on the linear image data read by the image reading portion 13, the detection processing portion 171 detects a size, in the main scanning direction, of the document sheet that is placed on the document sheet table 21. The linear image data may be one line of image data that is output by the image sensor 25, in a state where the first carriage 22 is positioned at a predetermined document sheet determining position (for example, a position distanced from a placement reference position 211 in the document sheet table 21 by a number of centimeters in the sub-scanning direction, as shown in FIG. 3). The detection processing portion 171 may detect an edge of the document sheet included in the linear image data, and based on a position of the detected edge, detect the size of the document sheet in the main scanning direction.

The determination processing portion 172 determines, based on the size of the document sheet in the main scanning direction detected by the detection processing portion 171, whether the document sheet is a predetermined card-shaped document sheet Ca (see FIG. 3) or one of a plurality of predetermined standard-sized document sheets. In the following, a determination method performed by the determination processing portion 172 is described in detail.

As shown in FIG. 3, document sheets of various sizes can be placed on the document sheet table 21 in alignment with the predetermined placement reference position 211. The document sheet that can be placed on the document sheet table 21 is not limited to the document sheet of a standard size such as the A3, A4, B4, Folio, postcard sizes or the like (hereinafter referred to as a standard-sized document sheet), and may be a document sheet of any shape.

As shown in FIG. 3, the image reading portion 13 is provided with a document sheet sensor 28. The document sheet sensor 28 detects whether or not the document sheet exists at a detection position 212 that is distanced from the placement reference position 211 in the document sheet table 21 by a predetermined distance (for example, 315 mm) in the sub-scanning direction. For example, the document sheet sensor 28 is provided below the detection position 212, and is a reflective optical sensor including a light emitting portion and a light receiving portion. When the light emitting portion irradiates light towards the detection position 212, the light receiving portion receives light reflected from the detection position 212, and outputs an electronic signal to the control portion 17 in response to an amount of the received light. The amount of received light changes in response to whether or not the document sheet exists at the detection position 212. This allows for the control portion 17 to determine, based on the output signal from the document sheet sensor 28, whether or not the document sheet exists at the detection position 212.

The determination processing portion 172 determines a type of the document sheet, based on the size, in the main scanning direction, of the document sheet that is detected by the detection processing portion 171, and the detection result by the document sheet sensor 28. Specifically, the determination processing portion 172 determines the type of the document sheet with reference to the document sheet determining table D1 shown in FIG. 4.

Figure 4:
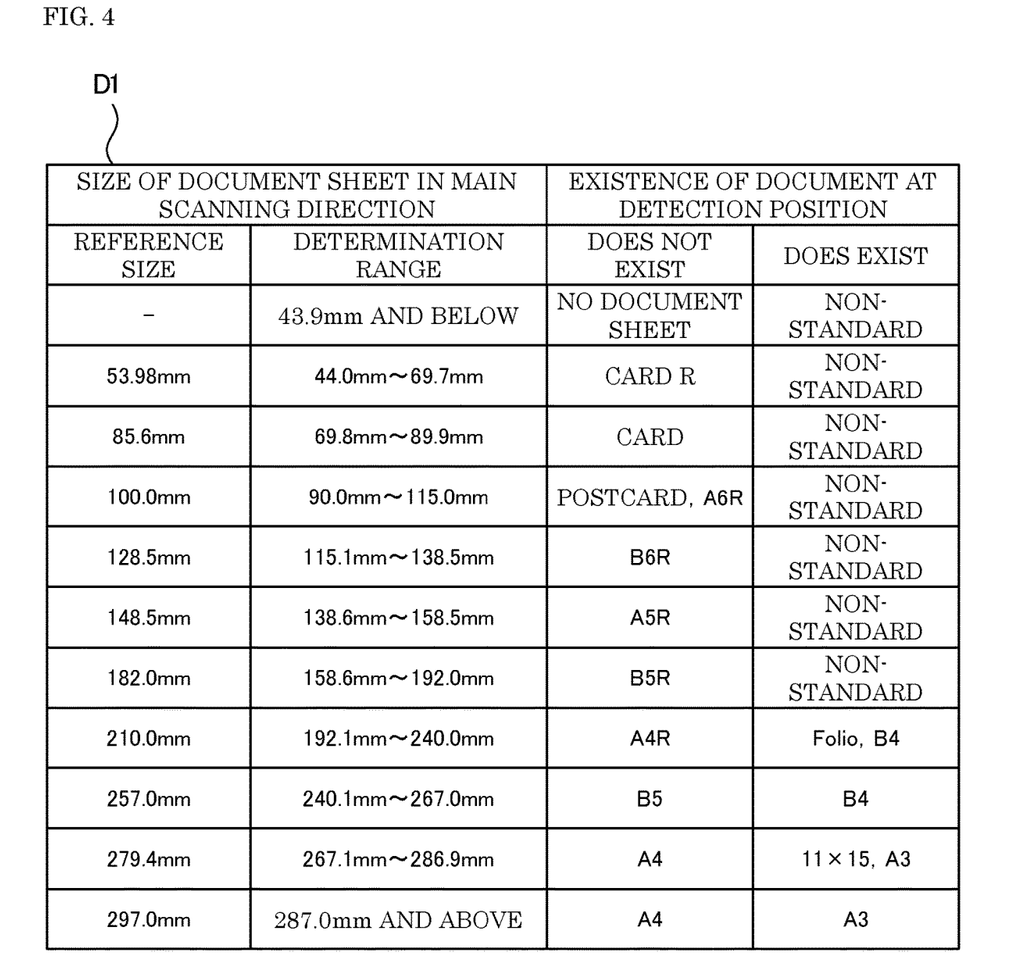
FIG. 4 is a diagram showing an example of a document sheet determination table used in the image forming apparatus according to the embodiment of the present disclosure.

In the document sheet determining table D1 shown in FIG. 4, sizes of the document sheet in the main scanning direction are categorized into eleven determination ranges. The determination ranges each correspond to a type of the document sheet (a standard-sized document sheet or the card-shaped document sheet Ca), and are set to a range including a reference size that is the size of the corresponding document sheet in the main scanning direction. As shown in FIG. 3, the size of the document sheet in the main scanning direction varies depending on the type of the document sheet. Accordingly, the determination processing portion 172 can narrow down the type of document sheet to some extent by determining the determination range that includes the size of the document sheet detected by the detection processing portion 171. For example, when the size of the document sheet in the main scanning direction detected by the detection processing portion 171 is 258.6 mm, it can be determined that the document sheet is a B5 or B4 sized document sheet. In addition, the determination processing portion 172, based on whether or not the document sheet exists at the detection position 212, can further narrow down the type of the document sheet. For example, when the size of the document sheet in the main scanning direction detected by the detection processing portion 171 is 258.6 mm, and the document sheet is detected at the detection position 212, it can be determined that the document sheet is a B4 size document sheet. On the other hand, when the size of the document sheet in the main scanning direction detected by the detection processing portion 171 is 258.6 mm, and the document sheet is not detected at the detection position 212, it can be determined that the document sheet is a B5 size document sheet.

As shown in FIG. 3, the size of the card-shaped document sheet Ca such as a driver's license or a health insurance card is smaller than all of the standard-sized document sheets. When the size of the document sheet in the main scanning direction detected by the detection processing portion 171 meets a specific condition, the determination processing portion 172 determines that the document sheet is the predetermined card-shaped document sheet Ca (see FIG. 3).

The specific condition is, for example, that the size of the document sheet in the main scanning direction detected by the detection processing portion 171 is included in a first determination range or a second determination range, wherein the first determination range (for example, the determination range "69.8 mm~89.9 mm" shown in FIG. 4) includes a reference size (for example, 85.6 mm) of the card-shaped document sheet Ca in its longitudinal direction, and the second determination range (for example, the determination range "44.0 mm~69.7 mm" shown in FIG. 4) includes a reference size (for example, 53.98 mm) of the card-shaped document sheet Ca in the transverse direction. It is noted that the reference sizes and determination ranges that correspond to the card-shaped document sheet Ca may be preset based on an international standard (ISO/IEC 7810) specifying a shape of an identification card, and may be preset in response to a user operation. In addition, the reference sizes and determination ranges of the card-shaped document sheet Ca may be changed at any time in response to a user operation performed according to a type of card-shaped document sheet Ca that is desired for detection.

It is noted that the detection position 212 of the document sheet sensor 28 is distanced from an area, in the document sheet table 21, in which the card-shaped document sheet Ca is placed (that is, an area that is covered by the card-shaped document sheet Ca when it is placed vertically or horizontally in alignment with the placement reference position 211). With this configuration, even if the size of the document sheet in the main scanning direction detected by the detection processing portion 171 meets the specific condition, if the document sheet is detected at the detection position 212, it can be determined that the document sheet is special in that it has a shape that is narrow and elongated in the sub-scanning direction of the document sheet. Here, when the size of the document sheet in the main scanning direction detected by the detection processing portion 171 meets the specific condition, and the document sheet sensor 28 detects that the document sheet does not exist at the detection position 212, the determination processing portion 172 can determine that the document sheet is the card-shaped document sheet Ca.

The deletion processing portion 173 executes an imaging process (hereinafter referred to as a border deletion process) of deleting, from an edge portion of the document sheet of the document sheet image data, an image of an area (shaded part of the document sheet image data shown in FIG. 6) having a predetermined deletion width W1. The border deletion process deletes (for example, replaces with white) an unnecessary shadow or border that appears near the outer edge of the document sheet of the document sheet image data that has been read by the image reading portion 13.

Figure 6:
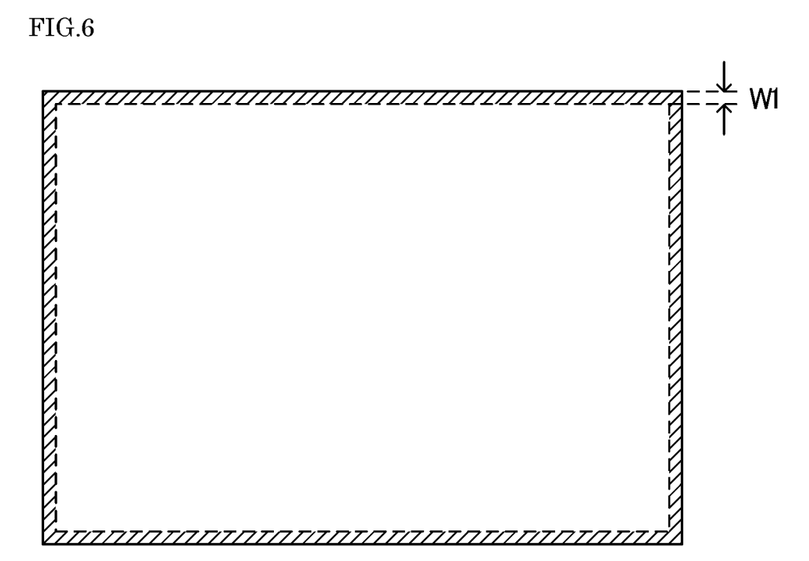
FIG. 6 is a diagram showing an example of an area in a document sheet of the document sheet image data where an image is deleted by a deletion process executed in the image forming apparatus according to the embodiment of the present disclosure.

Meanwhile, since the card-shaped document sheet Ca is smaller than the standard-sized document sheets, in contrast to the standard-sized document sheets, it is often the case that the card-shaped document sheet Ca has characters written near its outer edge. In this case, when the border deletion process is executed on an area having the same deletion width W1 as the standard-sized document sheets, there is a risk of deleting necessary information (characters) together with the unnecessary shadow or border. As a solution to this issue, the deletion processing portion 173 may change the size of the deletion width W1 between a case where the determination processing portion 172 determines that the document sheet is the card-shaped document sheet Ca, and a case where the determination processing portion 172 determines that the document sheet is not the card-shaped document sheet Ca. For example, when the determination processing portion 172 determines that the document sheet is the card-shaped document sheet Ca, the deletion processing portion 173 may set the size of the deletion width W1 narrower than for when the determination processing portion 172 determines that the document sheet is one of the standard-sized document sheets (for example, an A4, B5, or postcard sized document sheet). For example, when the determination processing portion 172 determines that the document sheet is one of the standard-sized document sheets, the deletion processing portion 173 may set the deletion width W1 to 2~3 mm, and when the determination processing portion 172 determines that the document sheet is the card-shaped document sheet Ca, the deletion processing portion 173 may set the deletion width W1 to 0~1 mm.

With this configuration, it is possible to prevent necessary information (characters) from being deleted by the border deletion process.

Figure 7:
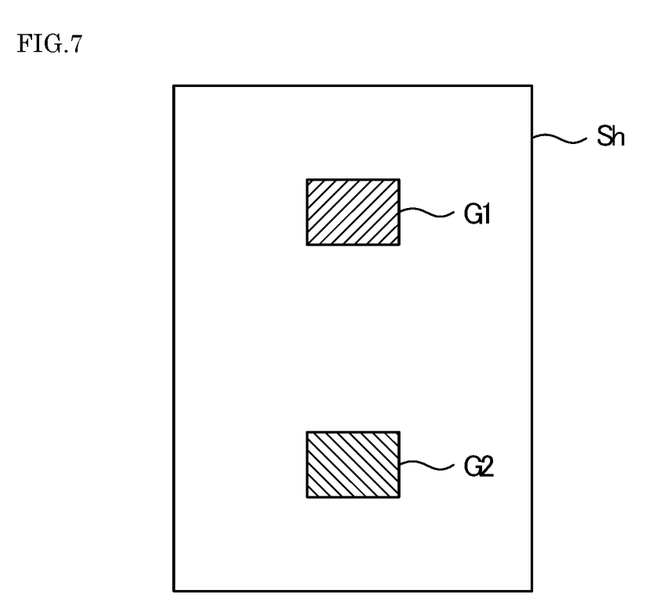
FIG. 7 is a diagram showing an example of a sheet on which images of a card-shaped document sheet have been formed by the image forming apparatus according to the embodiment of the present disclosure.

The setting processing portion 174 sets an operation condition for the image forming portion 14. Specifically, when the determination processing portion 172 determines that the document sheet is the card-shaped document sheet Ca, the setting processing portion 174 sets a specific operation condition as the operation condition for the image forming portion 14. For example, the operation condition is to form, on one side of one sheet Sh, images (image G1 and image G2) of both the front side and back side of the document sheet (that is, the card-shaped document sheet Ca), as shown in FIG. 7. It is noted that the specific operation condition may be set in advance in response to a user operation on the operation/display portion 11, and may be changed accordingly in response to a user operation on the operation/display portion 11. On the other hand, when the determination processing portion 172 determines that the document sheet is one of the standard-sized document sheets, the setting processing portion 174 sets the operation condition for the image forming portion 14 in response to a user operation on the operation/display portion 11.

[Copy Process]

Figure 5:
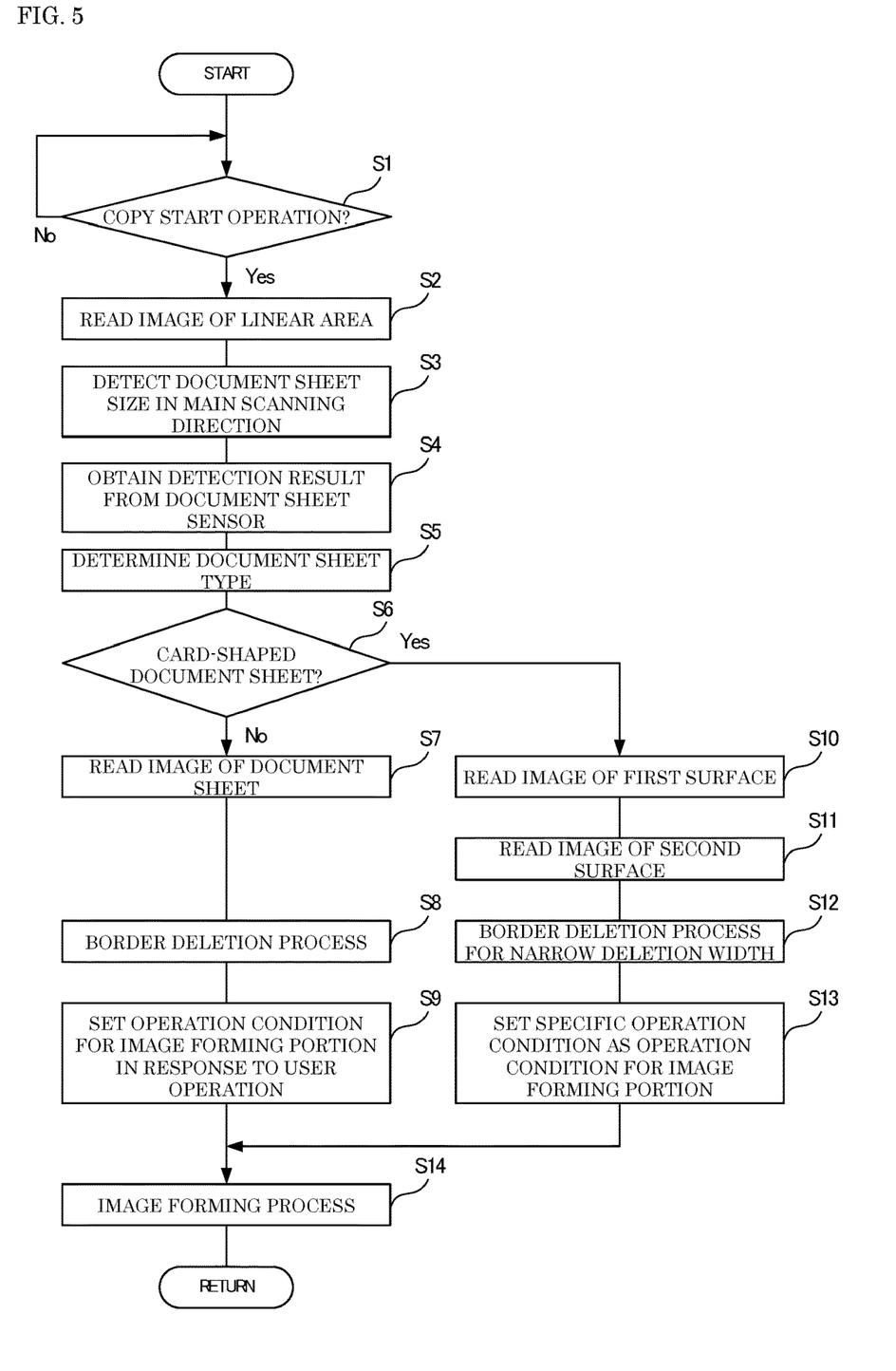
FIG. 5 is a flowchart showing an example procedure of a copy process executed in the image forming apparatus according to the embodiment of the present disclosure.

Below, with reference to FIG. 5, a description is given of an example procedure of the copy process executed by the control portion 17. Here, steps S1, S2 . . . indicate the numbers of processing procedures (steps) executed by the control portion 17. It is noted that, for example, the copy process is started in response to the image forming apparatus 1 being turned on, and ended in response to the image forming apparatus 1 being turned off.

<Step S1>

First, in step S1, the control portion 17 determines whether or not a copy start operation has been performed on the operation/display portion 11. For example, when an operation is performed on a "copy" button included in a menu screen (not shown) that is displayed on the operation/display portion 11, the control portion 17 determines that the copy start operation has been performed. When it is determined that the copy operation has been performed (S1: Yes), the process moves to step S2. On the other hand, when the control portion 17 determines that the copy start operation has not been performed (S1: No), the process in step S1 is repeated until it is determined that the copy start operation has been performed.

<Step S2>

In step S2, the control portion 17 causes the image reading portion 13 to read linear image data that represents an image of a linear area along the main scanning direction of a document sheet that is placed on the document sheet table 21.

<Step S3>

In step S3, the control portion 17, based on the linear image data read in step S2, detects a size of the document sheet in the main scanning direction. Processing in step S3 is executed by the detection processing portion 171 of the control portion 17.

<Step S4>

In step S4, the control portion 17 obtains a detection result (that is, whether or not the document sheet exists at the detection position 212) from the document sheet sensor 28. The control portion 17 determines whether or not the document sheet exists at the detection position 212 based on an output signal from the document sheet sensor 28.

<Step S5>

In step S5, the control portion 17 determines a type of the document sheet based on the size of the document sheet in the main scanning direction detected in step S3, the detection results of the document sheet sensor 28 obtained in step S4, and with reference to the document sheet determining table D1 stored in the storage portion 16. Processing in step S5 is executed by the determination processing portion 172 of the control portion 17.

<Step S6>

In step S6, the control portion 17 determines whether or not the type of the document sheet is the card-shaped document sheet Ca. When the control portion 17 determines that the type of the document sheet is the card-shaped document sheet Ca (S6: Yes), the process moves to step S10. On the other hand, when the control portion 17 determines that the type of the document sheet is not the card-shaped document sheet Ca (S6: No), the process moves to step S7.

<Step S7>

In step S7, the control portion 17 causes the image reading portion 13 to read an image of the document sheet that is placed on the document sheet table 21. This allows for the document sheet image data to be generated.

<Step S8>

In step S8, the control portion 17 executes the border deletion process on the document sheet image data. Here, the control portion 17 executes the border deletion process on an area having the predetermined deletion width W1 (for example, 2~3 mm). Processing in step S8 is executed by the deletion processing portion 173 of the control portion 17.

<Step S9>

In step S9, the control portion 17 sets an operation condition for the image forming portion 14, in response to a user operation on the operation/display portion 11. Then, the process moves to step S14. Processing in step S9 is executed by the setting processing portion 174 of the control portion 17.

<Step S10>

On the other hand, when it is determined that the type of the document sheet is the card-shaped document sheet Ca, in step S10, the control portion 17 causes the image reading portion 13 to read an image of a first surface (that is, a surface on a side that is in contact with the document sheet table 21) of the card-shaped document sheet Ca that is placed on the document sheet table 21. This allows for the document sheet image data of the first side of the card-shaped document sheet Ca to be generated.

When the first side of the card-shaped document sheet Ca has been read, the control portion 17 displays, on the operation/display portion 11, a message prompting the user to flip over the card-shaped document sheet Ca. Then, when a user operation indicating that the card-shaped document sheet Ca has been flipped over (for example, an operation on an [OK] button that is displayed on the operation/display portion 11), the process moves to step S11.

<Step S11>

In step S11, the control portion 17 causes the image reading portion 13 to read an image of a second surface (that is, a surface on an opposite side of the first surface) of the card-shaped document sheet Ca that is placed on the document sheet table 21. This allows for the document sheet image data of the second surface of the card-shaped document sheet Ca to be generated.

<Step S12>

In step S12, the control portion 17 executes the border deletion process on the document sheet image data of the first and second surfaces of the document sheet. Here, the control portion 17 executes the border deletion process on an area having the deletion width W1 (for example, 0~1 mm) that is narrower than that of the area on which the border deletion process is performed in step S8. Processing in step S12 is executed by the deletion processing portion 173 of the control portion 17.

<Step S13>

In step S13, the control portion 17 sets an operation condition for the image forming portion 14 to the specific operation condition (for example, an operation condition that forms, on one side of one sheet Sh, the image G1 of the first surface and the image G2 of the second surface of the card-shaped document sheet Ca, as shown in FIG. 7). Then, the process moves to step S14. Processing in step S13 is executed by the setting processing portion 174 of the control portion 17. It is noted that the operation condition for the image forming portion 14 set in step S13 can be changed as necessary in response to a user operation on the operation/display portion 11.

<Step S14>

In step S14, the control portion 17 causes the image forming portion 14 to execute an image forming process based on the operation condition set in step S9 or step S13. Then, the process returns to step S1.

It is noted that although a copy process is described here, the present disclosure may also be applied to a scan process or a facsimile transmission process. For example, in a scan process, it is determined in step S1 whether or not a scan start operation has been performed. Then, instead of the steps S9, S13, and S14, the document sheet image data after the border deletion process has been executed is stored in a specific storage space (for example, the storage portion 16, a storage device that is removably attached to the image forming apparatus 1, or an information processing device that is communicably connected to the image forming apparatus 1). In addition, in a facsimile transmission process, it is determined in step S1 whether or not a facsimile transmission start operation has been performed. Then, instead of the steps S9, S13, and S14, the document sheet image data after the border deletion process has been executed is transmitted to a specific transmission destination (for example, a facsimile device that is communicably connected to the image forming apparatus 1).

As described above, in the image forming apparatus 1 according to the present embodiment, the size of the document sheet in the main scanning direction is detected based on linear image data representing an image of a linear area that extends along the main scanning direction of the document sheet that is placed on the document sheet table 21. When the detected size meets a specific condition, it is determined that the document sheet is the card-shaped document sheet Ca. With this configuration of the image forming apparatus 1 according to the present embodiment, it is possible to determine, without performing pre-scanning, whether or not the document sheet placed on the document sheet table 21 is the card-shaped document sheet Ca.

In addition, in the image forming apparatus 1 according to the present embodiment, when the document sheet is determined to be the card-shaped document sheet Ca, the border deletion process is executed on an area having a width narrower than that of when the document sheet is determined to not be the card-shaped document sheet Ca. With this configuration of the image forming apparatus 1 according to the present embodiment, it is possible to prevent necessary information (characters) from being deleted by the border deletion process.

In addition, in the image forming apparatus 1 according to the present embodiment, when the document sheet is determined to be the card-shaped document sheet Ca, an operation condition of the image forming portion 14 is set to the specific operation condition (for example, to form an image of both sides of the card-shaped document sheet Ca on one side of one sheet Sh, as shown in FIG. 7). With this configuration, it is possible to greatly reduce labor for a user when he or she copies both sides of the card-shaped document sheet Ca, such as a driver's license or a health insurance card.

It is noted that when the copy start operation is performed in the present embodiment, although it is determined whether or not the document sheet placed on the document sheet table 21 is the card-shaped document sheet Ca, this function (that is, an automatic card determination function that automatically determines whether or not the document sheet placed on the document sheet table 21 is the card-shaped document sheet Ca) can be arbitrarily enabled and disabled in response to a user operation. For example, by disabling the automatic card determination function, it is possible for a user that frequently performs a reading operation on an image of a non-standard-sized document sheet other than the card-shaped document sheet Ca, to prevent the non-standard-sized document sheet other than the card-shaped document sheet Ca from being incorrectly recognized as the card-shaped document sheet Ca.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus, comprising:
   a document sheet table on which a document sheet is placed;
   an image reading portion configured to read linear image data representing an image of a linear area that extends along a main scanning direction of the document sheet that is placed on the document sheet table;
   a detection processing portion configured to detect, based on the linear image data, a size of the document sheet in the main scanning direction; and
   a determination processing portion configured to determine, when the size of the document sheet in the main scanning direction detected by the detection processing portion meets a specific condition, that the document sheet is a predetermined card-shaped document sheet, wherein
   the specific condition is that the size of the document sheet in the main scanning direction detected by the detection processing portion is included in a first determination range that includes a reference size of the card-shaped document sheet in a longitudinal direction, or a second determination range that includes a reference size of the card-shaped document sheet in a transverse direction,
   the image reading portion generates, based on a plurality of pieces of the linear image data that are sequentially read along a sub-scanning direction of the document sheet, document sheet image data representing an image of the document sheet,
   the image reading apparatus further comprises a deletion processing portion configured to delete, from an edge portion of the document sheet of the document sheet image data, an image of an area having a predetermined deletion width, and the deletion processing portion changes the deletion width between a case where the determination processing portion determines that the document sheet is the card-shaped document sheet, and a case where the determination processing portion determines that the document sheet is not the card-shaped document sheet.

2. The image reading apparatus according to claim 1, further comprising
a document sheet sensor configured to detect whether or not the document sheet exists at a detection position that is distanced from an area in the document sheet table in which the card-shaped document sheet is placed, wherein
the determination processing portion determines that the document sheet is the card-shaped document sheet when the size of the document sheet in the main scanning direction detected by the detection processing portion meets the specific condition, and the document sensor detects that the document sheet does not exist at the detection position.

3. The image reading apparatus according to claim 1, wherein
the determination processing portion determines, based on the size of the document sheet in the main scanning direction detected by the detection processing portion, whether the document sheet is the card-shaped document sheet or one of a plurality of standard-sized document sheets,
the card-shaped document sheet has a size that is smaller than that of each of the plurality of standard-sized document sheets, and
when the determination processing portion determines that the document sheet is the card-shaped document sheet, the deletion processing portion changes the deletion width to a width that is narrower than that of when the determination processing portion determines that the document sheet is one of the plurality of standard-sized document sheets.

4. The image reading apparatus according to claim 1, the image reading apparatus further comprising:
an image forming portion configured to form, based on the document sheet image data, an image on a sheet, and
a setting processing portion configured to set an operation condition for the image forming portion, wherein
when the determination processing portion determines that the document sheet is the card-shaped document sheet, the setting processing portion sets a specific operation condition as the operation condition for the image forming portion.

5. The image reading apparatus according to claim 4, wherein
the specific operation condition includes forming, on one side of one sheet, images of both sides of the document sheet.

* * * * *